(12) United States Patent
Laitinen et al.

(10) Patent No.: US 12,022,275 B2
(45) Date of Patent: Jun. 25, 2024

(54) CONVERTING BINAURAL SIGNALS TO STEREO AUDIO SIGNALS

(71) Applicant: Nokia Technologies Oy, Espoo (FI)

(72) Inventors: Mikko-Ville Laitinen, Espoo (FI); Juha Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 128 days.

(21) Appl. No.: 17/778,454

(22) PCT Filed: Nov. 13, 2020

(86) PCT No.: PCT/FI2020/050751
§ 371 (c)(1),
(2) Date: May 20, 2022

(87) PCT Pub. No.: WO2021/105550
PCT Pub. Date: Jun. 3, 2021

(65) Prior Publication Data
US 2022/0417691 A1 Dec. 29, 2022

(30) Foreign Application Priority Data
Nov. 25, 2019 (GB) .................................... 1917133

(51) Int. Cl.
*H04S 7/00* (2006.01)
*H04B 17/364* (2015.01)
*H04R 1/32* (2006.01)
*H04S 1/00* (2006.01)

(52) U.S. Cl.
CPC ............ *H04S 7/30* (2013.01); *H04B 17/364* (2015.01); *H04R 1/323* (2013.01); *H04S 1/002* (2013.01); *H04R 2430/20* (2013.01)

(58) Field of Classification Search
None
See application file for complete search history.

(56) References Cited

U.S. PATENT DOCUMENTS

2008/0232617 A1  9/2008  Goodwin et al. ............. 381/307
2008/0298610 A1* 12/2008  Virolainen .............. H04S 7/302
                                                        381/300

FOREIGN PATENT DOCUMENTS

GB          2563635 A    12/2018
WO    WO-2018234624 A1   12/2018

OTHER PUBLICATIONS

Jakka Julia: "Binaural to Multichannel Audio Upmix" Helsinki University of Technolog Department of Technicalphysics—Dissertation Jun. 6, 2005.

(Continued)

*Primary Examiner* — Kenny H Truong
(74) *Attorney, Agent, or Firm* — Harrington & Smith

(57) ABSTRACT

An apparatus including circuitry configured to: obtain a binaural audio signal; obtain, based on the binaural audio signal, at least one direction parameter of at least one frequency band of the binaural audio signal; process the binaural audio signal to generate at least two audio signals for loudspeaker reproduction by modifying an inter-channel difference of the at least one frequency band of the binaural audio signal based on the at least one direction parameter for the at least one frequency band; and output the at least two audio signals for loudspeaker reproduction.

20 Claims, 7 Drawing Sheets

(56) References Cited

OTHER PUBLICATIONS

Goodwin, Michael, et. al., "Multichannel Surround Format Conversion and Generalized Upmix", Mar. 1, 2007, AES Conference, 2 pgs., abstract only.
Vilkamo, Juha, et. al., "Optimized /covariance Domain Framework for Time-Frequency Processing of Spatial Audio", Jul. 8, 2013, JAES vol. 61, 2 pgs., abstract only.
Pulkki, Ville, "Virtual Sound Source Positioning Using Vector Base Amplitude Panning", © Audio Engineering Society, Inc. 1997, 11 pgs.
Jakka, Julia, "Binaural to Multichannel Audio Upmix", Helsinki University of Technology, Jun. 6, 2005, 29 pgs.

* cited by examiner ial Stage application of International Patent Application Number PCT/FI2020/050751 filed Nov. 13, 2020, which is hereby incorporated by reference in its entirety, and claims priority to GB 1917133.9 filed Nov. 25, 2019.

CONVERTING BINAURAL SIGNALS TO STEREO AUDIO SIGNALS

CROSS REFERENCE TO RELATED APPLICATION

This patent application is a U.S. National Stage application of International Patent Application Number PCT/FI2020/050751 filed Nov. 13, 2020, which is hereby incorporated by reference in its entirety, and claims priority to GB 1917133.9 filed Nov. 25, 2019.

FIELD

The present application relates to apparatus and methods for converting binaural signals to stereo audio signals, but not exclusively for converting within a spatial audio signal environment.

BACKGROUND

Human perception of sound direction is based on binaural cues that include inter-aural time differences (ITD), inter-aural level differences (ILD), and spectral cues. Stereo signals for loudspeaker reproduction are typically produced using amplitude panning (e.g., VBAP as discussed in "Virtual Sound Source Positioning Using Vector Base Amplitude Panning", Ville Pulkki, Journal of Audio Engineering Society, 1997.), which translates to these cues when the amplitude panned sound is reproduced with stereo loudspeakers and listened to by a human listener.

Correspondingly, human perception of spaciousness and envelopment of sound is based on binaural cues related to inter-aural coherence (IC). The stereo signals are typically produced in a way (e.g., using reverberators) that IC cues generating a perception of width or spaciousness (etc) are produced at the human ears when the stereo signals are reproduced by stereo loudspeakers.

On the other hand, the binaural signals are meant to be reproduced by headphones. Thus, the binaural cues (including ITD, ILD, IC, and spectral cues) need to be inherent in the audio signals themselves. This may be achieved, e.g., by recording spatial sound with microphones on the entrances of the ear canals of a real human or an artificial head. A binaural sound can also be generated synthetically, e.g., by applying appropriate head-related transfer functions (HRTFs) and reverberators to a multi-channel loudspeaker mix. When such a binaural recording, or binaural audio in general, is reproduced with headphones (possibly after headphone correction), realistic perception of spatial sound is achieved.

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as for example immersive voice and audio for virtual reality (VR).

Input signals can be presented to the IVAS encoder in one of a number of supported formats (and in some allowed combinations of the formats).

It has been proposed for IVAS to use binaural signals as an input and having conventional stereo audio output.

There is a need for apparatus and methods for efficiently converting binaural signals to conventional stereo audio signals as the stereo audio signal are better suited for loudspeaker playback.

SUMMARY

There is provided according to a first aspect an apparatus comprising means configured to: obtain a binaural audio signal; obtain, based on the binaural audio signal, at least one direction parameter of at least one frequency band of the binaural audio signal; process the binaural audio signal to generate at least two audio signals for loudspeaker reproduction by modifying an inter-channel difference of the at least one frequency band of the binaural audio signal based on the at least one direction parameter for the at least one frequency band; and output the at least two audio signals for loudspeaker reproduction.

The inter-channel difference of the at least one frequency band of the binaural audio signal may comprise at least one of: at least one energy/amplitude difference for channels of the binaural audio signal; at least one phase difference for channels of the binaural audio signal; and at least one time difference for channels of the binaural audio signal.

The means configured to process the binaural audio signal to generate at least two audio signals for loudspeaker reproduction may be configured to further apply a spectral adjustment to the processed at least one frequency band further based on the at least one direction parameter for the at least one frequency band.

The means configured to process the binaural audio signal to generate at least two audio signals for loudspeaker reproduction by modifying an inter-channel difference of the at least one frequency band based on the at least one direction parameter for the at least one frequency band may be configured to: generate an estimate of at least a part of a covariance matrix for the at least one frequency band of the binaural audio signal; generate an energy estimate for the at least one frequency band of the binaural audio signal; generate at least a part of a target covariance matrix for the at least one frequency band of the binaural audio signal based on the at least one direction parameter for the at least one frequency band; generate a mixing matrix for mixing the at least one frequency band of the binaural audio signal; and generate a left channel audio signal and a right channel audio signal from a combination of channels of the at least one frequency band of the binaural audio signal based on the mixing matrix.

The at least two audio signals for loudspeaker reproduction may comprise the left channel audio signal and the right channel audio signal.

The means configured to process the binaural audio signal to generate at least two audio signals for loudspeaker reproduction by modifying an inter-channel difference of the at least one frequency band based on the at least one direction parameter for the at least one frequency band may be further configured to: generate, for at least one frequency band, a decorrelated audio signal based on the binaural audio signal; generate a further mixing matrix for the decorrelated audio signal; generate a further left channel audio signal and a further right channel audio signal from a combination of channels of the at least one frequency band of the decorrelated audio signal based on the further mixing matrix; combine the left channel audio signal and the further left channel audio signal to generate a combined left channel; and combine the right channel audio signal and the further right channel audio signal to generate a combined right channel, and wherein the at least two audio signals for loudspeaker reproduction comprise the combined left channel audio signal and the combined right channel audio signal.

The means configured to further apply a spectral adjustment to the processed at least one frequency band further based on the at least one direction parameter for the at least one frequency band may be configured to: determine a binaural response and/or long-term response estimate based on the direction parameter for the at least one frequency; and compensate for the determined binaural response and/or long-term response estimate from the processed at least one frequency band.

The binaural response and/or long-term response may comprise at least one of: at least one energy/amplitude; at least one correlation for channels of the binaural audio signal; at least one phase difference for channels of the binaural audio signal; at least one time difference for channels of the binaural audio signal.

The binaural response and/or long-term response may comprise a spectra of the binaural audio signal, and wherein the means configured to remove the determined binaural response and/or long-term response estimate from the processed at least one frequency band may be configured to: obtain a filter and/or gain based on the estimated direction parameter and an averaged head related transfer function corresponding to the at least one direction parameter; and apply the filter and/or gain to the to the processed at least one frequency band.

The means configured to determine a binaural response and/or long-term response estimate based on the direction parameter for the at least one frequency band may be configured to generate a long-term equalization filter by comparing average spectra of the binaural signals and predetermined HRTF data sets, and wherein the means configured to remove the determined binaural response and/or long-term response estimate from the processed at least one frequency band may be configured to apply the long-term equalization filter to the processed at least one frequency band.

The means configured to obtain, based on the binaural audio signal, at least one direction parameter for at least one frequency band of the binaural audio signal may be configured to analyse the at least one frequency band of the binaural audio signal to determine the at least one direction parameter for the at least one frequency band.

The means configured to analyse the at least one frequency band of the binaural audio signal to determine the at least one direction parameter for the at least one frequency band may be further configured to: estimate for the at least one frequency band a delay that maximizes a correlation between channels of the binaural audio signal; and formulate a direction parameter based on the estimated delay.

The means may be further configured to obtain for the at least one frequency band of the binaural audio signal a direct-to-total energy ratio value based on a measured normalized correlation between channels of the binaural audio signal.

The means configured to generate at least a part of a target covariance matrix for the at least one frequency band of the binaural audio signal based on the at least one direction parameter for the at least one frequency band may be further configured to generate the at least the part of the target covariance matrix for the at least one frequency band of the binaural audio signal further based on the direct-to-total energy ratio value for the at least one frequency band.

The means configured to determine a binaural response and/or long-term response estimate based on the at least one direction parameter for the at least one frequency may be configured to determine the binaural response and/or long-term response estimate based on the direct-to-total energy ratio value for the at least one frequency band.

The means configured to obtain a binaural audio signal may be configured to perform one of: capture the binaural audio signal with a dummy head; capture the binaural audio signal at an entrance of ear canals of a user; render the binaural audio signals from head-related transfer functions; and render the binaural audio signals using binaural room impulse responses.

The means configured to output the at least two audio signals for loudspeaker reproduction may be configured to output the at least two audio signals for loudspeaker reproduction to stereo loudspeakers.

According to a second aspect there is provided a method comprising: obtaining a binaural audio signal; obtaining, based on the binaural audio signal, at least one direction parameter of at least one frequency band of the binaural audio signal; processing the binaural audio signal to generate at least two audio signals for loudspeaker reproduction by modifying an inter-channel difference of the at least one frequency band of the binaural audio signal based on the at least one direction parameter for the at least one frequency band; and outputting the at least two audio signals for loudspeaker reproduction.

The inter-channel difference of the at least one frequency band of the binaural audio signal may comprise at least one of: at least one energy/amplitude difference for channels of the binaural audio signal; at least one phase difference for channels of the binaural audio signal; and at least one time difference for channels of the binaural audio signal.

Processing the binaural audio signal to generate at least two audio signals for loudspeaker reproduction may comprise to further applying a spectral adjustment to the processed at least one frequency band further based on the at least one direction parameter for the at least one frequency band.

Processing the binaural audio signal to generate at least two audio signals for loudspeaker reproduction by modifying an inter-channel difference of the at least one frequency band based on the at least one direction parameter for the at least one frequency band may comprise: generating an estimate of at least a part of a covariance matrix for the at least one frequency band of the binaural audio signal; generating an energy estimate for the at least one frequency band of the binaural audio signal; generating at least a part of a target covariance matrix for the at least one frequency band of the binaural audio signal based on the at least one direction parameter for the at least one frequency band; generating a mixing matrix for mixing the at least one frequency band of the binaural audio signal; and generating a left channel audio signal and a right channel audio signal from a combination of channels of the at least one frequency band of the binaural audio signal based on the mixing matrix.

The at least two audio signals for loudspeaker reproduction may comprise the left channel audio signal and the right channel audio signal.

Processing the binaural audio signal to generate at least two audio signals for loudspeaker reproduction by modifying an inter-channel difference of the at least one frequency band based on the at least one direction parameter for the at least one frequency band may further comprise: generating, for at least one frequency band, a decorrelated audio signal based on the binaural audio signal; generating a further mixing matrix for the decorrelated audio signal; generate a further left channel audio signal and a further right channel audio signal from a combination of channels of the at least one frequency band of the decorrelated audio signal based on the further mixing matrix; combining the left channel audio signal and the further left channel audio signal to generate a combined left channel; and combining the right channel audio signal and the further right channel audio signal to generate a combined right channel, and wherein the at least two audio signals for loudspeaker reproduction comprise the combined left channel audio signal and the combined right channel audio signal.

Applying a spectral adjustment to the processed at least one frequency band further based on the at least one direction parameter for the at least one frequency band may comprise: determining a binaural response and/or long-term response estimate based on the direction parameter for the at least one frequency; and compensating for the determined binaural response and/or long-term response estimate from the processed at least one frequency band.

The binaural response and/or long-term response may comprise at least one of: at least one energy/amplitude; at least one correlation for channels of the binaural audio signal; at least one phase difference for channels of the binaural audio signal; at least one time difference for channels of the binaural audio signal.

The binaural response and/or long-term response may comprise a spectra of the binaural audio signal, and wherein removing the determined binaural response and/or long-term response estimate from the processed at least one frequency band may comprise: obtaining a filter and/or gain based on the estimated direction parameter and an averaged head related transfer function corresponding to the at least one direction parameter; and applying the filter and/or gain to the to the processed at least one frequency band.

Determining a binaural response and/or long-term response estimate based on the direction parameter for the at least one frequency band may comprise generating a long-term equalization filter by comparing average spectra of the binaural signals and predetermined HRTF data sets, and wherein removing the determined binaural response and/or long-term response estimate from the processed at least one frequency band may comprise applying the long-term equalization filter to the processed at least one frequency band.

Obtaining, based on the binaural audio signal, at least one direction parameter for at least one frequency band of the binaural audio signal may comprise analysing the at least one frequency band of the binaural audio signal to determine the at least one direction parameter for the at least one frequency band.

Analysing the at least one frequency band of the binaural audio signal to determine the at least one direction parameter for the at least one frequency band may comprise: estimating for the at least one frequency band a delay that maximizes a correlation between channels of the binaural audio signal; and formulating a direction parameter based on the estimated delay.

The method may further comprise obtaining for the at least one frequency band of the binaural audio signal a direct-to-total energy ratio value based on a measured normalized correlation between channels of the binaural audio signal.

Generating at least a part of a target covariance matrix for the at least one frequency band of the binaural audio signal based on the at least one direction parameter for the at least one frequency band may further comprise generating the at least the part of the target covariance matrix for the at least one frequency band of the binaural audio signal further based on the direct-to-total energy ratio value for the at least one frequency band.

Determining a binaural response and/or long-term response estimate based on the at least one direction parameter for the at least one frequency may comprise determining the binaural response and/or long-term response estimate based on the direct-to-total energy ratio value for the at least one frequency band.

Obtaining a binaural audio signal may comprise performing one of: capturing the binaural audio signal with a dummy head; capturing the binaural audio signal at an entrance of ear canals of a user; rendering the binaural audio signals from head-related transfer functions; and rendering the binaural audio signals using binaural room impulse responses.

Outputting the at least two audio signals for loudspeaker reproduction may comprise outputting the at least two audio signals for loudspeaker reproduction to stereo loudspeakers.

According to a third aspect there is provided an apparatus comprising at least one processor and at least one memory including a computer program code, the at least one memory and the computer program code configured to, with the at least one processor, cause the apparatus at least to: obtain a binaural audio signal; obtain, based on the binaural audio signal, at least one direction parameter of at least one frequency band of the binaural audio signal; process the binaural audio signal to generate at least two audio signals for loudspeaker reproduction by modifying an inter-channel difference of the at least one frequency band of the binaural audio signal based on the at least one direction parameter for the at least one frequency band; and output the at least two audio signals for loudspeaker reproduction.

The inter-channel difference of the at least one frequency band of the binaural audio signal may comprise at least one of: at least one energy/amplitude difference for channels of the binaural audio signal; at least one phase difference for channels of the binaural audio signal; and at least one time difference for channels of the binaural audio signal.

The apparatus caused to process the binaural audio signal to generate at least two audio signals for loudspeaker reproduction may be caused to further apply a spectral adjustment to the processed at least one frequency band further based on the at least one direction parameter for the at least one frequency band.

The apparatus caused to process the binaural audio signal to generate at least two audio signals for loudspeaker reproduction by modifying an inter-channel difference of the at least one frequency band based on the at least one direction parameter for the at least one frequency band may be caused to: generate an estimate of at least a part of a covariance matrix for the at least one frequency band of the binaural audio signal; generate an energy estimate for the at least one frequency band of the binaural audio signal; generate at least a part of a target covariance matrix for the at least one frequency band of the binaural audio signal based on the at least one direction parameter for the at least one frequency band; generate a mixing matrix for mixing the at least one frequency band of the binaural audio signal; and generate a left channel audio signal and a right channel audio signal from a combination of channels of the at least one frequency band of the binaural audio signal based on the mixing matrix.

The at least two audio signals for loudspeaker reproduction may comprise the left channel audio signal and the right channel audio signal.

The apparatus caused to process the binaural audio signal to generate at least two audio signals for loudspeaker reproduction by modifying an inter-channel difference of the at least one frequency band based on the at least one direction parameter for the at least one frequency band may be further caused to: generate, for at least one frequency band, a decorrelated audio signal based on the binaural audio signal; generate a further mixing matrix for the decorrelated audio signal; generate a further left channel audio signal and a further right channel audio signal from a combination of channels of the at least one frequency band of the decorrelated audio signal based on the further mixing matrix; combine the left channel audio signal and the further left channel audio signal to generate a combined left channel; and combine the right channel audio signal and the further right channel audio signal to generate a combined right channel, and wherein the at least two audio signals for loudspeaker reproduction comprise the combined left channel audio signal and the combined right channel audio signal.

The apparatus caused to further apply a spectral adjustment to the processed at least one frequency band further based on the at least one direction parameter for the at least one frequency band may be caused to: determine a binaural response and/or long-term response estimate based on the direction parameter for the at least one frequency; and compensate for the determined binaural response and/or long-term response estimate from the processed at least one frequency band.

The binaural response and/or long-term response may comprise at least one of: at least one energy/amplitude; at least one correlation for channels of the binaural audio signal; at least one phase difference for channels of the binaural audio signal; at least one time difference for channels of the binaural audio signal.

The binaural response and/or long-term response may comprise a spectra of the binaural audio signal, and wherein the apparatus caused to remove the determined binaural response and/or long-term response estimate from the processed at least one frequency band may be caused to: obtain a filter and/or gain based on the estimated direction parameter and an averaged head related transfer function corresponding to the at least one direction parameter; and apply the filter and/or gain to the to the processed at least one frequency band.

The apparatus caused to determine a binaural response and/or long-term response estimate based on the direction parameter for the at least one frequency band may be caused to generate a long-term equalization filter by comparing average spectra of the binaural signals and predetermined HRTF data sets, and wherein the apparatus caused to remove the determined binaural response and/or long-term response estimate from the processed at least one frequency band may be caused to apply the long-term equalization filter to the processed at least one frequency band.

The apparatus caused to obtain, based on the binaural audio signal, at least one direction parameter for at least one frequency band of the binaural audio signal may be caused to analyse the at least one frequency band of the binaural audio signal to determine the at least one direction parameter for the at least one frequency band.

The apparatus caused to analyse the at least one frequency band of the binaural audio signal to determine the at least one direction parameter for the at least one frequency band may be further caused to: estimate for the at least one frequency band a delay that maximizes a correlation between channels of the binaural audio signal; and formulate a direction parameter based on the estimated delay.

The apparatus may be caused to obtain for the at least one frequency band of the binaural audio signal a direct-to-total energy ratio value based on a measured normalized correlation between channels of the binaural audio signal.

The apparatus caused to generate at least a part of a target covariance matrix for the at least one frequency band of the binaural audio signal based on the at least one direction parameter for the at least one frequency band may be further configured to generate the at least the part of the target covariance matrix for the at least one frequency band of the binaural audio signal further based on the direct-to-total energy ratio value for the at least one frequency band.

The apparatus caused to determine a binaural response and/or long-term response estimate based on the at least one direction parameter for the at least one frequency may be caused to determine the binaural response and/or long-term response estimate based on the direct-to-total energy ratio value for the at least one frequency band.

The apparatus caused to obtain a binaural audio signal may be caused to perform one of: capture the binaural audio signal with a dummy head; capture the binaural audio signal at an entrance of ear canals of a user; render the binaural audio signals from head-related transfer functions; and render the binaural audio signals using binaural room impulse responses.

The apparatus caused to output the at least two audio signals for loudspeaker reproduction may be caused to output the at least two audio signals for loudspeaker reproduction to stereo loudspeakers.

According to a fourth aspect there is provided an apparatus comprising: obtaining circuitry configured to obtain a binaural audio signal; obtain, based on the binaural audio signal, at least one direction parameter of at least one frequency band of the binaural audio signal; processing circuitry configured to process the binaural audio signal to generate at least two audio signals for loudspeaker reproduction by modifying an inter-channel difference of the at least one frequency band of the binaural audio signal based on the at least one direction parameter for the at least one frequency band; and outputting circuitry configured to output the at least two audio signals for loudspeaker reproduction.

According to a fifth aspect there is provided a computer program comprising instructions [or a computer readable medium comprising program instructions] for causing an apparatus to perform at least the following: obtaining a binaural audio signal; obtaining, based on the binaural audio signal, at least one direction parameter of at least one frequency band of the binaural audio signal; processing the binaural audio signal to generate at least two audio signals for loudspeaker reproduction by modifying an inter-channel difference of the at least one frequency band of the binaural audio signal based on the at least one direction parameter for the at least one frequency band; and outputting the at least two audio signals for loudspeaker reproduction.

According to a sixth aspect there is provided a non-transitory computer readable medium comprising program instructions for causing an apparatus to perform at least the following: obtaining a binaural audio signal; obtaining, based on the binaural audio signal, at least one direction parameter of at least one frequency band of the binaural audio signal; processing the binaural audio signal to generate at least two audio signals for loudspeaker reproduction by modifying an inter-channel difference of the at least one frequency band of the binaural audio signal based on the at least one direction parameter for the at least one frequency band; and outputting the at least two audio signals for loudspeaker reproduction.

According to a seventh aspect there is provided an apparatus comprising: means for obtaining a binaural audio signal; means for obtaining, based on the binaural audio signal, at least one direction parameter of at least one frequency band of the binaural audio signal; means for processing the binaural audio signal to generate at least two audio signals for loudspeaker reproduction by modifying an inter-channel difference of the at least one frequency band of the binaural audio signal based on the at least one direction parameter for the at least one frequency band; and means for outputting the at least two audio signals for loudspeaker reproduction.

According to an eighth aspect there is provided a computer readable medium comprising program instructions for causing an apparatus to perform at least the following: obtaining a binaural audio signal; obtaining, based on the binaural audio signal, at least one direction parameter of at least one frequency band of the binaural audio signal; processing the binaural audio signal to generate at least two audio signals for loudspeaker reproduction by modifying an inter-channel difference of the at least one frequency band of the binaural audio signal based on the at least one direction parameter for the at least one frequency band; and outputting the at least two audio signals for loudspeaker reproduction.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
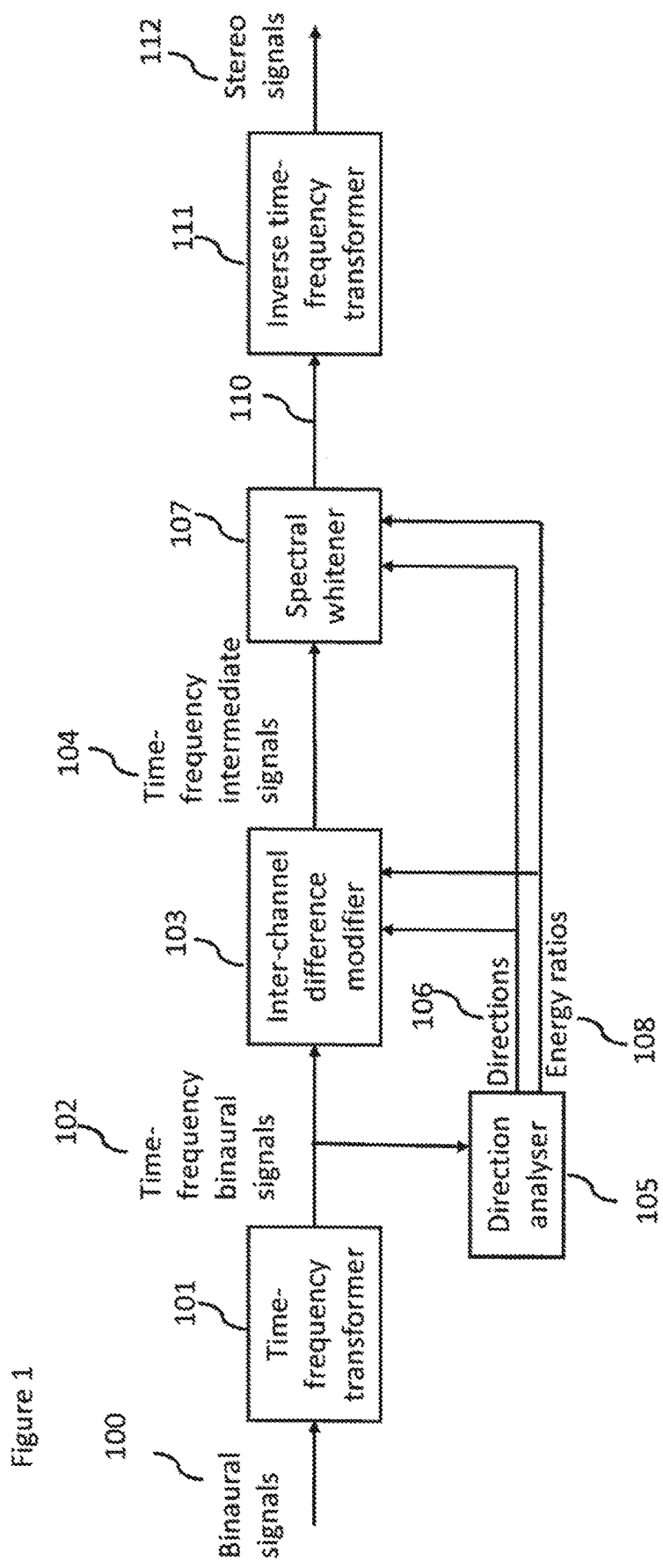
FIG. 1 shows schematically a system of apparatus suitable for implementing some embodiments.

The following describes in further detail suitable apparatus and possible mechanisms for the conversion of binaural signals to conventional stereo audio signals.

The concept as discussed in the embodiments below in further detail is one of generating suitable stereo audio signals from binaural audio signals. In the following description there is generated at least two audio signals (which may include a left and right channel audio signal or may include front, mid, rear, upper or lower versions of the left and right channels). The generated stereo audio signals can be reproduced with (stereo) loudspeakers. As a result, the binaural cues (ITD, ILD, IC, spectral cues) at the listener's ears generated by the stereo-loudspeaker reproduction of the generated stereo audio signals are similar to the binaural cues when the binaural signals are played back on headphones, and the spatial audio is perceived in the intended manner. In other words it aims to prevent differences of perception at the listener's ears dependent on the output means. The differences may include: differences in the direction of sound, differences in the width of sound, differences in the spaciousness of sound, differences in spectrum of the sound.

Regarding spectral differences, binaural signals typically contain distinctive spectra caused by reflections from human ears, head, torso, etc. The embodiments as discussed herein aim to produce a stereo audio signal based on the binaural signal where this distinctive spectra is compensated for such that when reproduced with (stereo) loudspeakers and listened to by a human listener, there are no additional binaural responses at the signals. As a result, the human listener does not receive "double binaural spectra" and the perception of timbre is similar to the original timbre.

Regarding the directional differences, binaural signals are, at lower frequencies, close to being effectively a dual mono signal with potential phase differences, and therefore the reproduction of such a signal over stereo loudspeakers produces at lower frequencies the effect similar to amplitude panning the sound to the middle of the loudspeaker pair. The embodiments as discussed herein attempt to generate a stereo audio signal which when reproduced with a stereo loudspeaker configuration maintains an appropriate perception of width and source localization when compared to the binaural audio signals when reproduced over headphones.

The embodiments as discussed herein are configured to generate suitable stereo audio signals from binaural audio signals and therefore when using stereo loudspeakers as the playback means prevent the need to use the binaural signals and thus prevent or reduce any spatial and timbral perceptual errors. As a result, the embodiments as discussed herein have an improved perceived audio quality, because the sound sources are not perceived from wrong directions and the timbre is not coloured by the binaural audio signals being directly reproduced using stereo loudspeakers.

The concept as discussed in the embodiments herein may be summarized as apparatus and methods which relate to reproducing binaural signals with loudspeakers and where there is provided apparatus and/or methods for converting binaural signals to "non-binaural" stereo signals that are suitable for stereo and multichannel loudspeaker reproduction. Additionally as described in the embodiments herein the conversion is performed by analyzing the direction of arrival (or more generally the direction parameter) in frequency bands from the binaural signals, and modifying the binaural signals, based on the analyzed direction, so that the inter-channel differences and spectra match the expected features of "non-binaural" stereo signals.

The binaural signals may be any kind of binaural signals, such as: signals captured with a dummy head, signals captured at the entrance of the ear canals of real humans, signals rendered using head-related transfer functions, or signals rendered using binaural room impulse responses. Moreover, the binaural signals may or may not contain headphone compensation of any type (that have been derived, e.g., using measured headphone transfer functions).

The binaural signals are intended for headphone listening, and when doing so, they create natural perception of spatial sound (via natural ITDs, ILDs, and spectra). As a result, sound sources can be perceived from correct directions with correct timbre. In contrast, the "non-binaural" stereo signals are intended for loudspeaker listening (i.e., they are "conventional" stereo signals). If listened over headphones the reproduction does not resemble a binaural sound in terms of ITDs, ILDs, nor the binaural spectra, but, instead, these features are formed when the "non-binaural" stereo signals are reproduced by the loudspeakers and are propagated to the ears of the listener.

The direction of arrival may be analysed by estimating in frequency bands the delay that maximizes the correlation between the (binaural) signals and formulating a direction value based on that delay value. A direct-to-total energy ratio value is estimated in frequency bands based on the measured normalized correlation between the binaural left and right signals.

The inter-channel differences may in some embodiments be modified by determining based on the direction and ratio metadata at least the target energies/amplitudes (and potentially correlations, phase/time differences) for the loudspeaker reproduction, and correcting at least the energies/amplitudes (and potentially correlations, phase/time differences) of the input binaural signals to match the corresponding target properties.

The spectra in some embodiments may be modified by first obtaining filters (or gains in frequency bands) based on the estimated direction of arrival and averaged HRTFs (of multiple HRTF sets) corresponding to that direction. Moreover, a long-term equalization filter may be applied by comparing average spectra of the binaural signals and predetermined HRTF data sets (having also varying headphone compensations).

The resulting "non-binaural" signals in some embodiments substantially remove or reduce any binaural features (inherent in the original binaural signals) in them. The binaural features are thus to be added by the acoustic propagation from the loudspeakers to the ears of the listener. Thus, good audio quality (precise and natural directional perception and uncoloured timbre) can be achieved for the loudspeaker reproduction of the binaural signals using the present invention.

With respect to FIG. 1 is shown a block diagram of apparatus suitable for implementing some embodiments. As described later this apparatus could be implemented inside a mobile phone or a computer. Moreover, it could, for example be implemented as a stand-alone apparatus or program or it could, for example be part of an audio codec, such as the IVAS codec.

The block diagram shows a binaural audio signal 100. The binaural audio signal 100 in this example is a time domain signal. However in some embodiments where the binaural audio signal 100 is a time-frequency domain signal then the use of the time-frequency transformer can be skipped or bypassed.

In some embodiments the apparatus comprises a time-frequency transformer 101. The time frequency transformer 101 is configured to receive the (time-domain) binaural audio signals 100 which converts them to the time-frequency domain. Suitable transforms include, e.g., short-time Fourier transform (STFT) and complex-modulated quadrature mirror filter (QMF) bank. The resulting time-frequency binaural audio signals 102 can be denoted as $S_m(b,n)$, where m is the channel index, b the frequency bin index, and n the time index.

The time-frequency binaural audio signals 102 may be forwarded to direction analyser 105 and to an inter-channel difference modifier 103.

In some embodiments the apparatus or converter comprises a direction analyser 105. The direction analyser 105 is configured to receive the time-frequency domain binaural audio signals 102 and analyse the direction of arrival $\theta(k,n)$ and the direct-to-total energy ratio $r(k,n)$ in the time-frequency domain, where k is the frequency band index.

The direction analysis is performed in frequency bands. The time-frequency transform has a certain frequency resolution, for example a 1024-point STFT would result in 513 frequency bins from the DC frequency to the Nyquist frequency. These bins are grouped into frequency bands, for example 24 frequency bands approximating a Bark frequency resolution.

The analysis may take place within these bands. Each frequency band k has a lowest bin $b_{low}(k)$ and a highest bin $b_{high}(k)$.

The analyser can for example be configured to find a delay $\tau_k$ that maximizes the correlation between the two channels for each band k. This can be accomplished by creating time-shifted versions of the signal in one of the channels and correlating these with the other channel signal. A time shift of $\tau$ time domain samples of $S_m(b,n)$ can be obtained as $$S_{m,\tau}(b, n) = S_m(b, n)e^{-j\frac{2\pi b\tau}{N}},$$

where N is the length of the STFT operation. The optimal delay $\tau_k$ for band k (and time index n) is obtained from $$c(k, n) = \max_\tau \sum\nolimits_{b=b_{low}(k)}^{b_{high}(k)} \text{Re}(S_{2,\tau}^*(b, n)S_1(b, n)), \tau \in [-D_{max}, D_{max}]$$

where c(k,n) is the correlation with the optimal delay $\tau_k$ (which is the argument $\tau$ that maximizes the above equation), Re indicates the real part of the result, and * denotes the complex conjugate. The range of searching for the delay $D_{max}$ is selected based on the estimated maximum time delay difference of sound arrival to the two ears.

The delay $T_k$ can be translated into an angular value by $$\theta(k, n) = \sin^{-1}\left(\frac{\tau_k}{D_{max}}\right).$$

This direction parameter is an azimuth value between −90 and 90 degrees. This direction information 106 is sufficient for rendering to a stereo loudspeaker output, since there are no elevated or rear loudspeakers (in other words the output audio signals are on the 'horizontal' plane and there are no elevation values required). The direction information 106 or signals can then be output to the inter-channel modifier 103 and the spectral whitener 107.

Additionally in some embodiments the direction analyser 105 is further configured to determine at least one corresponding energy ratio r(k,n). The energy ratio r(k,n) can be estimated using, e.g., the correlation value c(k,n) after normalizing it, e.g., by $$c'(k, n) = \frac{\sum_{b=b_{low}(k)}^{b_{high}(k)} \text{Re}(S_{2,\tau_k}^*(b, n) S_1(b, n))}{\sum_{b=b_{low}(k)}^{b_{high}(k)} (|S_{2,\tau_k}(b, n)||S_1(b, n)|)},$$

and then comparing the correlation value to the binaural diffuse field correlation of the centre frequency of band $C_{diff}(k)$ to obtain the ratio $$r(k, n) = \max\left(0, \frac{c'(k, n) - c_{diff}(k)}{1 - c_{diff}(k)}\right).$$

The estimated direct-to-total energy ratios can be also forwarded to the inter-channel difference modifier 103 and spectral whitener 107.

In some embodiments the converter comprises an inter-channel difference modifier 103. The inter-channel difference modifier 103 is configured to receive the time-frequency binaural audio signals 102 and the direction information 106 and energy ratio information 108. The inter-channel difference modifier 103 is configured, based on the analysed direction and the energy ratio, to modify at least the inter-aural level differences (and potentially the phase and/or time differences and/or coherences) of the time-frequency binaural audio signals in frequency bands so that the processed output has the inter-channel level differences (and potentially the phase and/or time differences and/or coherences) that are appropriate for loudspeaker reproduction of a sound at a direction θ(k,n) and having the direct-to-total energy ratio r(k,n).

The resulting time-frequency intermediate audio signals 104 are output from the inter-channel difference modifier and passed to a spectral whitener 107.

The converter in some embodiments comprises a spectral whitener 107. The spectral whitener is configured to receive the time-frequency intermediate audio signals 104. The time-frequency intermediate audio signals 104 have suitable directional cues (e.g., level differences) for loudspeaker playback, but they still have elements of the binaural spectra included, which may be removed using the spectral whitener 107. The spectral whitener 107 therefore further is configured to receive the direction information 106 and the direct-to-total energy ratio information 108. The spectral whitener 107 is configured to invert or compensate for the binaural spectrum, and the resulting time-frequency stereo audio signals 110 are outputted to an inverse time-frequency transformer 111.

In some embodiments the converter comprises an inverse time-frequency transformer 111. The inverse time-frequency transformer 111 is configured to apply the inverse transform corresponding to the applied time frequency transform, e.g. inverse STFT corresponding to the STFT, to the received time-frequency stereo audio signals 110 and to output suitable (pulse code modulated) PCM stereo audio signals 112 which may then be reproduced with stereo loudspeakers.

Figure 2:
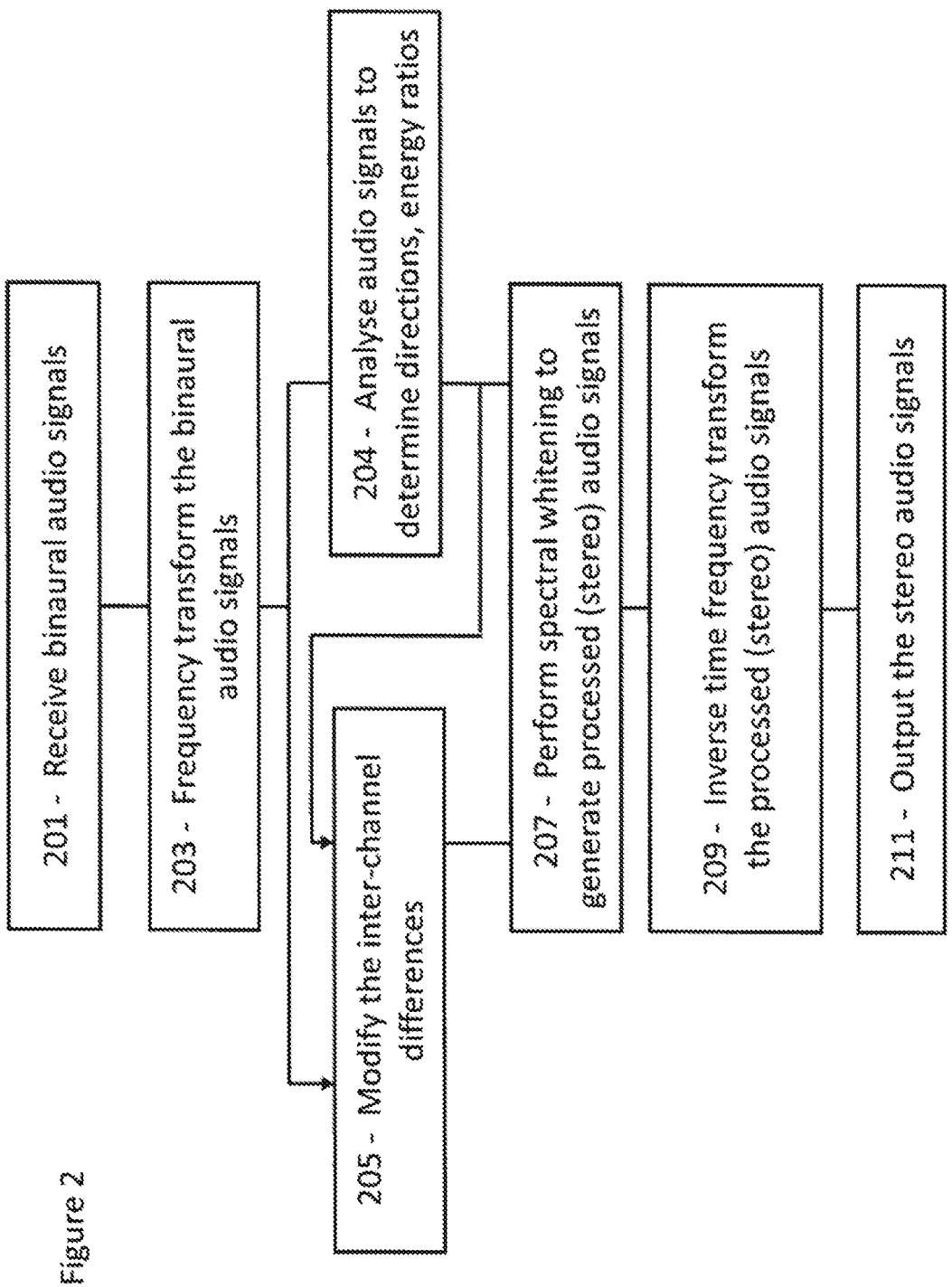
FIG. 2 shows a flow diagram of the operation of the example apparatus according to some embodiments.

With respect to FIG. 2 is shown a flow diagram showing the operations of the converter as shown in FIG. 1.

Thus for example the first operation is that of receiving the binaural audio signals as shown in FIG. 2 by step 201.

Then the binaural audio signals are time-frequency transformed to generate time-frequency binaural audio signals as shown in FIG. 2 by step 203.

The time-frequency binaural audio signals can then be analysed to determine directions and energy ratios as shown in FIG. 2 by step 204.

The time-frequency binaural audio signals may then be inter-channel modified based on the determined directions and energy ratios to generate time-frequency intermediate audio signals as shown in FIG. 2 by step 205.

The time-frequency intermediate audio signals may then be spectrally whitened also based on the determined directions and energy ratios to generate time-frequency processed (stereo) audio signals as shown in FIG. 2 by step 207.

Then the time-frequency processed (stereo) audio signals are inverse time-frequency transformed to generate stereo audio signals as shown in FIG. 2 by step 209.

The stereo audio signals can then be output as shown in FIG. 2 by step 211.

Figure 3:
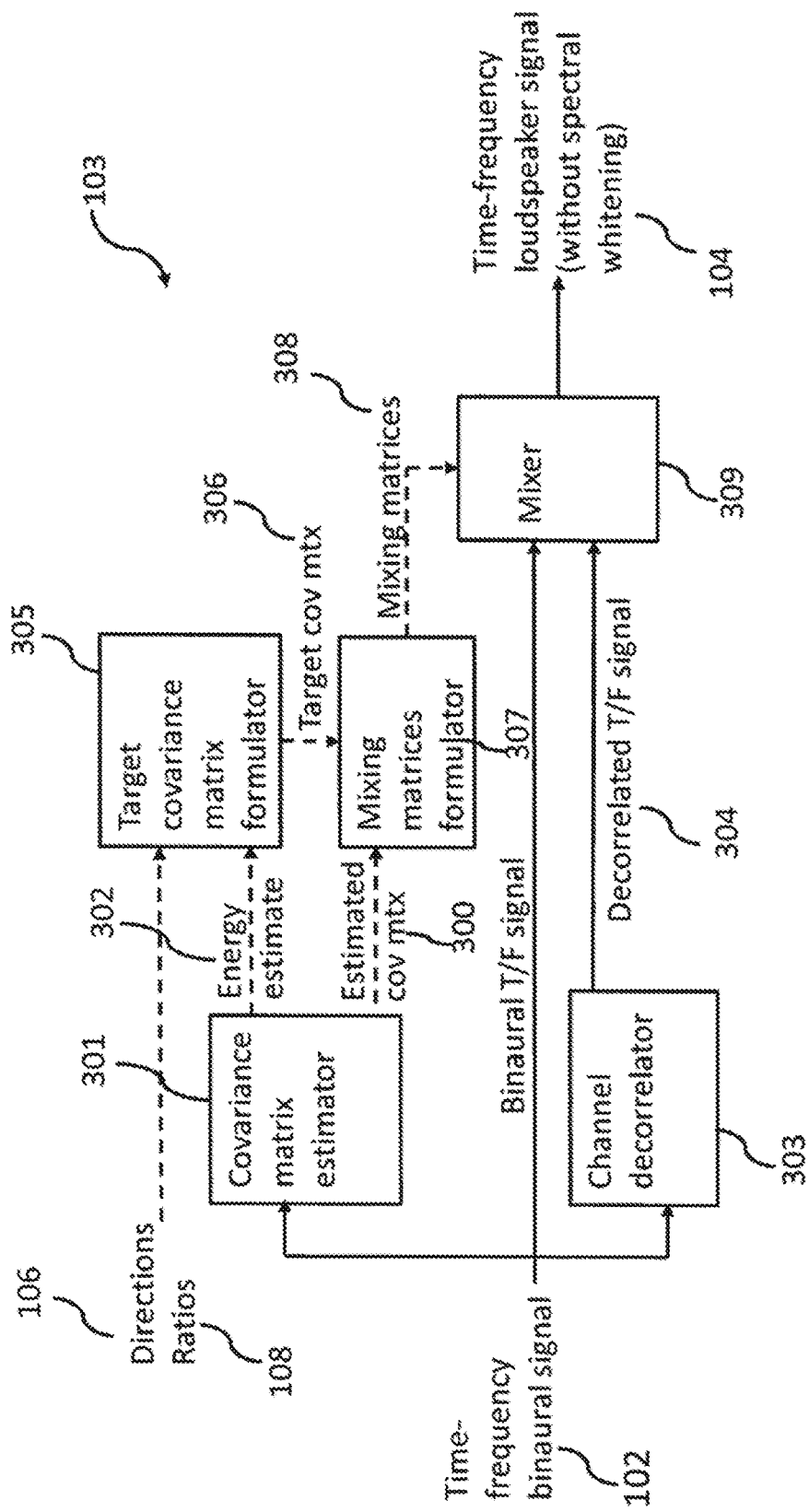
FIG. 3 shows schematically an inter-channel difference modifier as shown in FIG. 1 according to some embodiments.

With respect to FIG. 3 the inter-channel difference modifier 103 is shown in further detail. The inter-channel difference modifier 103 in some embodiments comprises a covariance matrix estimator 301. The covariance matrix estimator 301 is configured to receive the time-frequency binaural audio signals 102 and produce a suitable estimated covariance matrix (Estimated cov mtx) 300 such as:

$$C_{in}(k, n) = \sum_{b=b_{low}(k)}^{b_{high}(k)} s(b, n) s^H(b, n),$$

where H denotes the complex conjugate, and $$s(b, n) = \begin{bmatrix} S_1(b, n) \\ S_2(b, n) \end{bmatrix}.$$

The covariance matrix estimator 301 is configured to output the estimated covariance matrix $C_{in}(k,n)$ 300 to the mixing matrices formulator 307.

The covariance matrix estimator 301 may also be configured to formulate the overall energy estimates E(k,n) as the sum of the diagonal elements of $C_{in}(k,n)$. The overall energy estimates 302 are provided to a target covariance matrix formulator 305.

In the examples described herein the input and target covariance matrix formulation encapsulates a set of inter-channel properties (energy differences, phase differences, correlations), and all of these can be processed. However, in some embodiments there may be at least part of the signals (e.g., in some frequencies) where only the energies are to be adjusted or modified. In such cases, the full covariance matrix is not required to be estimated. However, for simplicity, full covariance matrices are here estimated, and the potentially unnecessary data (depending on the configuration) are then at a later stage not used. A practical implementation in some embodiments is configured to estimate only the data or information that is needed in the later stages.

In some embodiments the inter-channel difference modifier 103 comprises a target covariance matrix formulator 305. The target covariance matrix formulator 305 is configured to receive the energy estimate 302 as well as the direction θ(k,n) 106 and the direct-to-total energy ratio r(k,n) 108 parameters. The target covariance matrix formulator 305 in some embodiments generates a target covariance matrix for the output loudspeaker signal. This can be implemented in some embodiments by the following operations.

Firstly, the matrix generates a panning gain $$g(k, n) = \begin{cases} [1\ 0]^T, & \text{when } \theta(k, n) \geq 30° \\ [g_L(\theta(k, n)) g_R(\theta(k, n))]^T, & \text{when } 30° > \theta(k, n) > -30° \\ [0\ 1]^T, & \text{when } \theta(k, n) \leq -30° \end{cases}$$

where $g_L(\theta(k,n))$ and $g_R(\theta(k,n))$ are the gains from the vector base amplitude panning (VBAP) law for loudspeakers at ±30°

$$g'(\theta(k, n)) = \begin{bmatrix} g'_1(\theta(k, n)) \\ g'_2(\theta(k, n)) \end{bmatrix} = \begin{bmatrix} 3^{-1/2} & 1 \\ 3^{-1/2} & -1 \end{bmatrix} \begin{bmatrix} \cos(\theta(k, n)) \\ \sin(\theta(k, n)) \end{bmatrix} \text{ and }$$

$$\begin{bmatrix} g_L(\theta(k, n)) \\ g_R(\theta(k, n)) \end{bmatrix} = \frac{g'(\theta(k, n))}{\sqrt{(g'(\theta(k, n)))^T g'(\theta(k, n))}}$$

Then, the target covariance matrix is formulated as $$C_{target}(k, n) = E(k, n) \left( g(k, n) g^T(k, n) r(k, n) + (1 - r(k, n)) \begin{bmatrix} 0.5 & 0 \\ 0 & 0.5 \end{bmatrix} \right),$$

where the left part $g(k,n)g^T(k,n)r(k,n)$ accounts for the covariance matrix related to the front-panned sound, and the right part $$(1 - r(k, n)) \begin{bmatrix} 0.5 & 0 \\ 0 & 0.5 \end{bmatrix}$$

accounts for the covariance matrix related to the ambient (or non-directional) sound. As shown in the equation above, these are then added together and weighted with the overall energy estimate E(k,n) to obtain the target covariance matrix $C_{target}(k,n)$.

The target covariance matrix $C_{target}(k,n)$ 306 can then be provided to the mixing matrices formulator 307.

In some embodiments the inter-channel difference modifier 103 comprises a mixing matrices formulator 307. The mixing matrices formulator 307 is configured to receive the target covariance matrix 306 and the estimated covariance matrix 300 and generate mixing matrices 308 which may be passed to the mixer 309.

In some embodiments the mixing matrices formulator 307 is configured to generate the mixing matrix according to the methods described in US20140233762A1 and "Optimized covariance domain framework for time-frequency processing of spatial audio.", Vilkamo, Juha, Tom Bäckström, and Achim Kuntz, Journal of the Audio Engineering Society 61, no. 6 (2013): 403-411.

The methods within the cited paper comprise a least-squares optimized signal mixing technique to manipulate the covariance matrix of a signal, while well preserving the audio quality. The methods therefore utilize the covariance matrix measure of the input signal and a target covariance matrix and provide a mixing matrix to perform such processing. The methods also provide means to optimally utilize decorrelated sound when there is no sufficient amount of independent signal energy at the inputs.

In some embodiments therefore the mixing matrices formulator 307 is configured to generate a prototype matrix which determines how the output channels should resemble the input channels (while satisfying the synthesis of the target covariance matrix). In the present context that prototype matrix is $$Q = \begin{bmatrix} 1 & 0 \\ 0 & 1 \end{bmatrix}.$$

When Q, $C_{target}(k,n)$ and $C_{in}(k,n)$ are now known, the methods as discussed in the cited paper provide two mixing matrices M(k,n) for non-decorrelated sound and $M_r(k,n)$ for decorrelated sound. These mixing matrices 308 are provided to the mixer 309.

In some embodiments the mixing matrices formulator 307 is configured to compensate (only) for the energy of the signals and does not affect the phase or correlation between the channels. For example, at high frequencies this may be the most robust option, and at high frequencies phase/correlation information also has smaller perceptual relevance than at the low frequencies. In this case, the formulated mixing matrices could be:

$$M(k, n) = \begin{bmatrix} \sqrt{\frac{C_{target}(k, n)\{1, 1\}}{C_{in}(k, n)\{1, 1\}}} & 0 \\ 0 & \sqrt{\frac{C_{target}(k, n)\{2, 2\}}{C_{in}(k, n)\{2, 2\}}} \end{bmatrix}$$

$$M_r(k, n) = \begin{bmatrix} 0 & 0 \\ 0 & 0 \end{bmatrix}$$

where the brackets { } denote a selection of a single matrix entry from the covariance matrices. The processing is otherwise as described previously.

In some embodiments the inter-channel difference modifier 103 comprises a channel decorrelator 303. The channel decorrelator 303 is configured to receive the time-frequency binaural audio signal 102 and apply decorrelating to both channels s(b,n) to generate two incoherent versions (with respect to each other and with respect to the inputs) of the binaural input signals. The result is the decorrelated signals $s_d(b,n)$. A decorrelating procedure could be a time-invariant phase-scrambling procedure. Any decorrelator may be applied, and the choice of the decorrelator may depend on the applied time-frequency transform. The decorrelated signals 304 are then provided to the mixer 309.

In some embodiments the inter-channel difference modifier 103 comprises a mixer 309. The mixer 309 is configured to receive the time-frequency decorrelated audio signal 304, the time-frequency binaural audio signal 102 and the mixing matrices 308 and for each band k generate time-frequency loudspeaker signal 104 (without spectral whitening) as $$s'_{LS}(b,n) = M(k,n)s(b,n) + M_r(k,n)s_d(b,n).$$

The mixing matrices are for each band k, and the same mixing matrix can be applied for each bin b within that band. The mixing matrices (or alternatively the covariance matrices before formulating the mixing matrices) can be smoothed over time to reduce potential processing artefacts.

The mixer 309 is then configured to output the time-frequency intermediate (loudspeaker) signal (without spectral whitening) 104.

Figure 4:
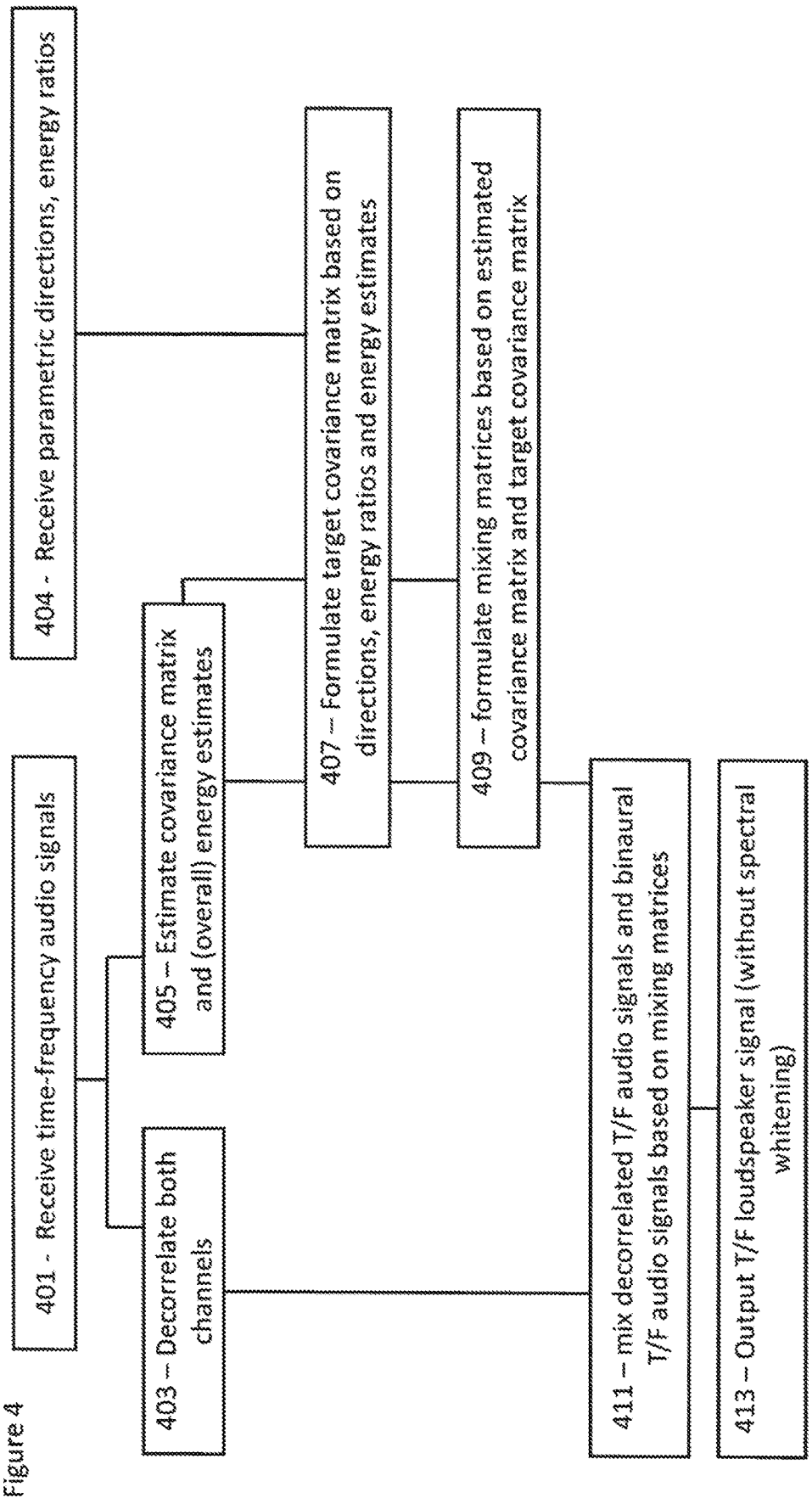
FIG. 4 shows a flow diagram of the operation of the example inter-channel difference modifier as shown in FIG. 3 according to some embodiments.

The operation of the inter-channel difference modifier 103 is shown in the flow diagram as shown in FIG. 4.

The receiving of time-frequency binaural audio signals is shown in FIG. 4 by step 401.

After receiving the time-frequency binaural audio signals both channels are decorrelated as shown in FIG. 4 by step 403.

Additionally from the time-frequency binaural audio signals the covariance matrix and (overall) energy estimates are estimated as shown in FIG. 4 by step 405.

The receiving of the parametric parameters such as directions and energy ratios is shown in FIG. 4 by step 404.

Following the receiving of the parametric parameters such as directions and energy ratios and the estimation of the covariance matrix the target covariance matrix is formulated as shown in FIG. 4 by step 407.

Having formulated the target covariance matrix then the mixing matrices are formulated as shown in FIG. 4 by step 409.

The time-frequency binaural audio signals and the time-frequency decorrelated audio signals are then mixed based on the formulated mixing matrices to generate time-frequency intermediate (loudspeaker) audio signals as shown in FIG. 4 by step 411.

Then the time-frequency intermediate (loudspeaker) audio signals are output as shown in FIG. 4 by step 413.

Figure 5:
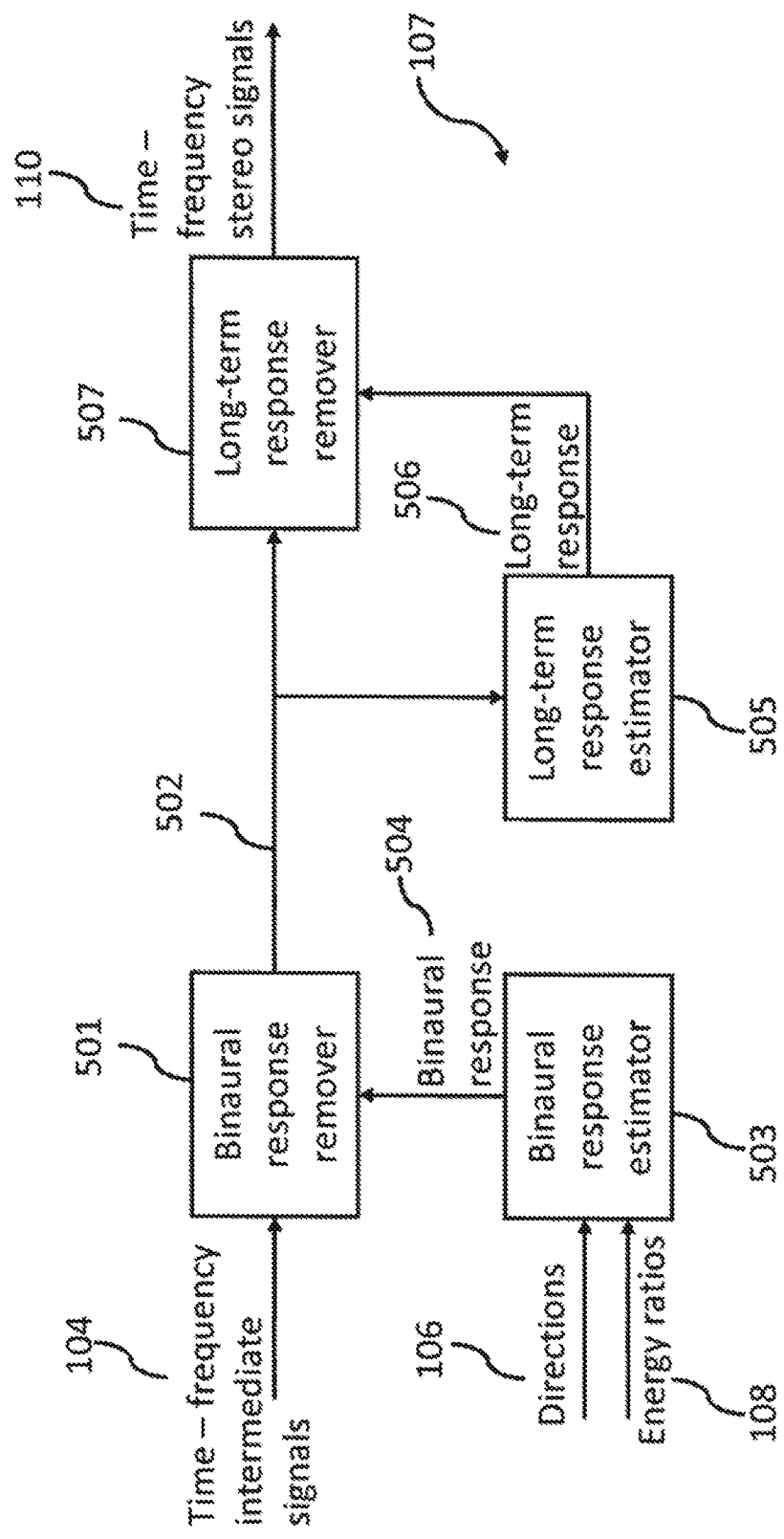
FIG. 5 shows schematically a spectral whitener as shown in FIG. 1 according to some embodiments.

With respect to FIG. 5 is shown a block diagram of an example spectral whitener 107 according to some embodiments.

The spectral whitener 107 is configured to receive a time-frequency intermediate (loudspeaker) signal (without spectral whitening) s'$_{LS}$(b,n) 104 and the directions θ(k,n) 106 and the direct-to-total energy ratios r(k,n) 108.

In some embodiments the spectral whitener 107 comprises a binaural response estimator 503. The binaural response estimator 503 in some embodiments is configured to receive the directions 106 and the energy ratios 108 and the binaural response estimator 503 can then estimate the energy response of typical binaural signals corresponding to the direction θ(k,n) and the energy ratio r(k,n). This energy response is common for both ears, as the inter-channel differences were already corrected in the inter-channel difference modifier 103.

The binaural response estimator 503 can for example be configured to firstly estimate the energy response for the direct sound based on the direction θ(k,n). This can for example be implemented by:

$E_{dir}(k,n) = f_{HRTF}(θ(k,n))$ where $f_{HRTF}$ [ ] is a function for obtaining the average energy spectrum of a HRTF pair corresponding to the direction θ at frequency band k. It can be implemented in any suitable way. For example several sets of HRTFs are obtained, in this example each having the same set of directions in the data set. Next, the average energy response of a HRTF pair is computed for each direction in each dataset, e.g., by $$E_{avg}(k, θ, i) = \frac{|H_{left}(k, θ, i)|^2 + |H_{right}(k, θ, i)|^2}{2}$$

where H$_{left}$ is the HRTF for the left ear and H$_{right}$ for the right ear, i is the index of the dataset, and |.| denotes computing the absolute value. When a HRTF is determined in band k, then the HRTF at the middle frequency of band k could be formulated. The datasets can be combined, e.g., by taking mean of them for each direction, resulting in $E_{avg}(k,θ)$. Then, finally $f_{HRTF}$ [ ] may be implemented, e.g., by interpolating between the nearest data points of $E_{avg}(k,θ)$ in order to obtain the value for the direction θ (in case the data set $E_{avg}(k,θ)$ has a data point exactly at direction θ, it may be directly used).

Next, the energy response for the ambient sound is estimated. As the estimate is not based on any parameter, it can be fetched from a database. An estimate of the ambient sound energy response can, e.g., be formed by averaging all directions of the averaged HRTF energy data set $$E_{amb}(k) = \frac{1}{D}\sum_{d=1}^{D} E_{avg}(k, θ(d)),$$

where θ(d) are the D HRTF directions within the data set.

Then, the estimate of the binaural energy response can be formed by $E_{bin}(k,n) = r(k,n)E_{dir}(k,n) + (1-r(k,n))E_{amb}(k)$ which can be output as the binaural response 504 to the binaural response remover 501.

In some embodiments the spectral whitener 107 comprises a binaural response remover 501. The binaural response remover 501 is configured to receive the time-frequency intermediate (loudspeaker) signal (without spectral whitening) s'$_{LS}$(b,n) 104 and binaural energy response $E_{bin}$(k,n) 504 as inputs. The binaural response remover 501 is configured to firstly formulate an equalizer by $$g_{EQ}(k, n) = \sqrt{\frac{1}{E_{bin}(k, n)}}$$

which may be temporally smoothed (or $E_{bin}$(k,n) may be temporally smoothed before formulating $g_{EQ}$(k,n)). A set of processed intermediate signals can then formulated by $s''_{LS}(b,n) = g_{EQ}(k,n)s'_{LS}(b,n)$ where k is the band index where bin b resides. At the resulting processed intermediate signals s''$_{LS}$(b,n) the binaural spectrum according to average HRTFs has been removed. Typically, these signals are already suitable for loudspeaker reproduction. However, as there may be differences in how the binaural signals were originally produced (e.g., there are different kind of artificial heads and different HRTF and BRIR databases), the spectra of the processed intermediate signals s''$_{LS}$(b,n) 502 may still deviate from the optimal.

Hence, the processed intermediate signals s''$_{LS}$(b,n) 502 may in some embodiments be forwarded to a long-term spectrum estimator 505 and to a long-term response remover 507.

In some embodiments the spectral whitener 107 comprises a long-term spectrum estimator 505 configured to receive the processed intermediate signals s''$_{LS}$(b,n) 502 and estimate the long-term spectrum of the intermediate signals and compare it to the expected average spectrum. Where the estimator finds reliable deviations between these two, it generates and sends an estimated long-term response H$_{lt}$(b, n) 506 to the long-term response remover 507.

In some embodiments the spectral whitener 107 comprises a long-term response remover 507 which is configured to receive and process the processed intermediate signals s"$_{LS}$(b,n) 502 based on the estimated long-term response 506 and output suitable time-frequency stereo (loudspeaker) audio signals 110

$$s_{LS}(b, n) = \frac{s''_{LS}(b, n)}{H_{lt}(b, n)}.$$

When no deviations are reliable detected, the estimated response H$_{lt}$(b,n) can be set to 1 at all frequencies. Moreover, in some embodiments, the long-term spectrum estimator 505 and the long-term response remover 507 are optional and may be omitted, and the processed intermediate audio signals s"$_{LS}$(b,n) 502 directly passed as the time-frequency stereo audio signals 110.

The output of the spectral whitener 107 is shown as time-frequency domain stereo signals s$_{LS}$(b,n), which are then transformed to time-domain signals as expressed in the context of FIG. 1, and the result is suitable for loudspeaker reproduction.

The binaural inter-channel differences have been modified to inter-channel differences that are more suitable for loudspeaker reproduction, and the binaural spectrum has been compensated for.

Figure 6:
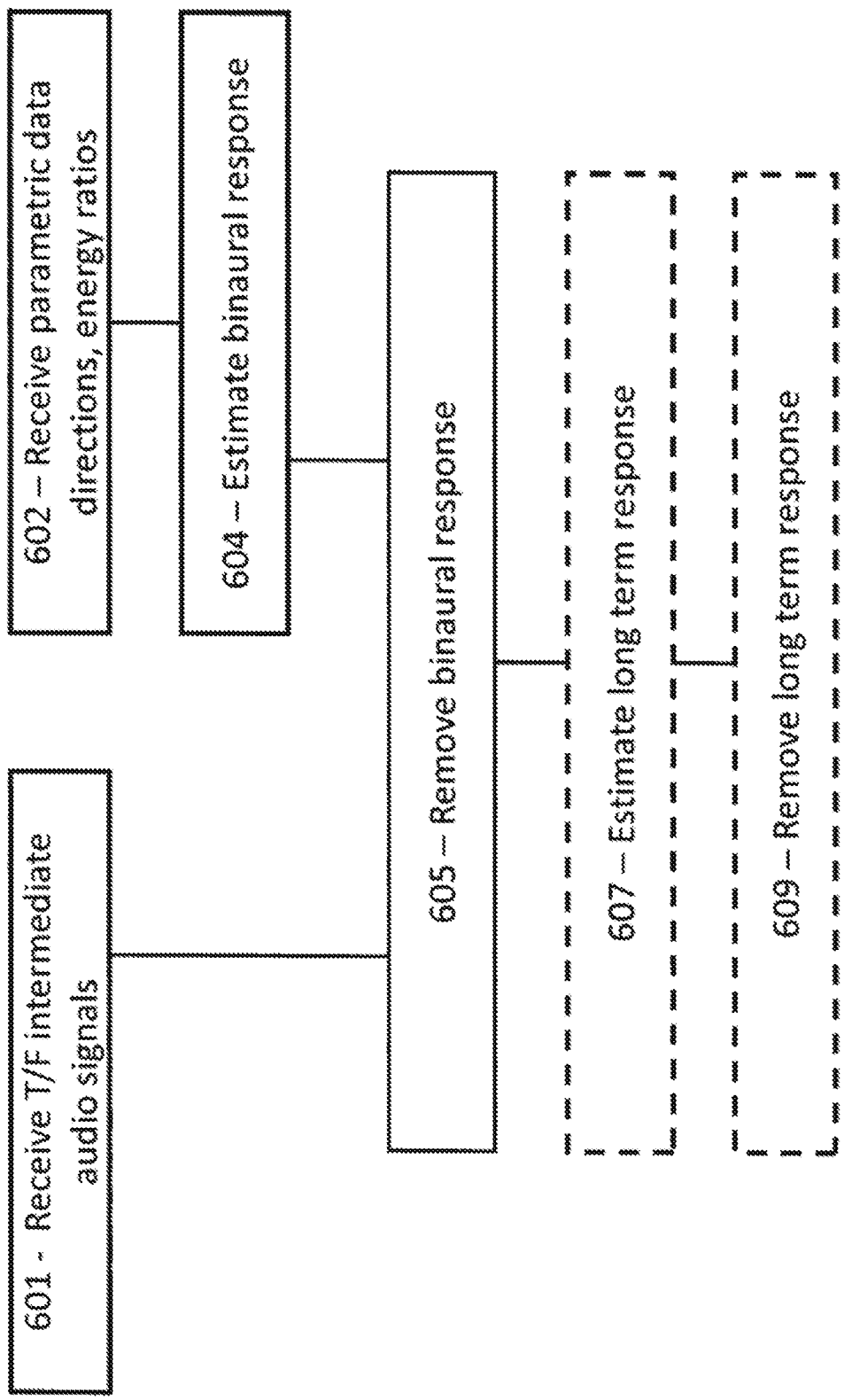
FIG. 6 shows a flow diagram of the operation of the example spectral whitener as shown in FIG. 5 according to some embodiments.

With respect to FIG. 6 a flow diagram showing the operations of the example spectral whitener 107 is shown.

Thus there is received the time-frequency intermediate audio signals as shown in FIG. 6 by step 601.

Additionally is received the parametric parameters such as directions and energy ratios is shown in FIG. 6 by step 602.

The binaural response is estimated as shown in FIG. 6 by step 604.

Then the estimated binaural response is removed from the time-frequency intermediate audio signals as shown in FIG. 6 by step 605.

Optionally then the long term response is estimated as shown in FIG. 6 by step 607.

Then the estimated long term response is then optionally removed as shown in FIG. 6 by step 609.

In the embodiments discussed above a binaural signal is converted entirely to a non-binaural stereo signal. However there may be situations where it is desirable that only a part of the binaural signal is converted to non-binaural stereo signal. For example, when the conversion from binaural to non-binaural occurs, it is possible to render only those directions that map to between the stereo loudspeakers as a non-binaural sound, while reproducing the remaining (binaural) sounds over the loudspeakers using a cross-talk cancelling scheme. Therefore in some embodiments a part of the binaural audio signal for ranges of directions are converted to a stereo signal and the remainder of the signal passed unconverted. This part may also be a part of the total energy of the binaural audio signals or may be a part of the spectra of the binaural audio signals (for example some of the frequency bands are converted and some of the frequency bands are passed unprocessed).

Figure 7:
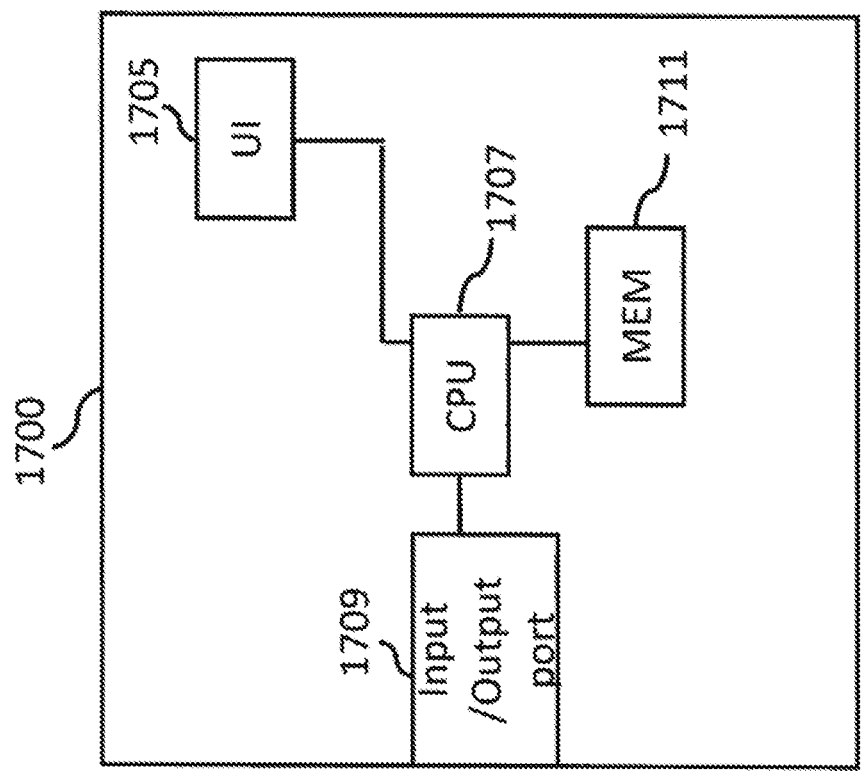
FIG. 7 shows an example device suitable for implementing the apparatus shown in previous figures.

With respect to FIG. 7 an example electronic device which may be used as any of the apparatus parts of the system as described above. The device may be any suitable electronics device or apparatus. For example in some embodiments the device 1700 is a mobile device, user equipment, tablet computer, computer, audio playback apparatus, etc.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals.

The input/output port 1709 may be coupled to any suitable audio output for example to a stereo speaker system.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
    at least one processor; and
    at least one memory including a computer program code, the at least one memory and the computer program code configured to, with the at least one processor, cause the apparatus at least to:
        obtain a binaural audio signal;
        obtain, based on analysis of at least one frequency band of the binaural audio signal, at least one direction parameter of the at least one frequency band of the binaural audio signal;
        process the binaural audio signal to generate at least two audio signals for loudspeaker reproduction with modifying an inter-channel difference of the at least one frequency band of the binaural audio signal based on the at least one direction parameter for the at least one frequency band; and
        output the at least two audio signals for loudspeaker reproduction.

2. The apparatus as claimed in claim 1, wherein the inter-channel difference comprises at least one of:
    at least one energy/amplitude difference between channels of the binaural audio signal;
    at least one phase difference for channels of the binaural audio signal; or
    at least one time difference for channels of the binaural audio signal.

3. The apparatus as claimed in claim 1, wherein the at least one memory and the computer program code are configured to, with the at least one processor, cause the apparatus to apply a spectral adjustment to the processed binaural audio signal based on the at least one direction parameter for the at least one frequency band.

4. The apparatus as claimed in claim 3, wherein the at least one memory and the computer program code are configured to, with the at least one processor, cause the apparatus to:
    determine a binaural response and/or long-term response estimate based on the direction parameter for the at least one frequency band; and
    compensate for the determined binaural response and/or long-term response estimate from the processed binaural audio signal.

5. The apparatus as claimed in claim 4, wherein the binaural response and/or long-term response estimate comprises at least one of:
    at least one energy/amplitude;
    at least one correlation for channels of the binaural audio signal;
    at least one phase difference for channels of the binaural audio signal; or
    at least one time difference for channels of the binaural audio signal.

6. The apparatus as claimed in claim 4, wherein the binaural response and/or long-term response estimate comprises a spectra of the binaural audio signal, and wherein the at least one memory and the computer program code are configured to, with the at least one processor, cause the apparatus to:
    obtain a filter and/or gain based on the estimated direction parameter and an averaged head related transfer function corresponding to the at least one direction parameter; and
    apply the filter and/or gain to the to the processed binaural audio signal.

7. The apparatus as claimed in claim 4, wherein the at least one memory and the computer program code are configured to, with the at least one processor, cause the apparatus to generate a long-term equalization filter with comparing average spectra of the binaural signals and predetermined HRTF data sets, and to further cause the apparatus to apply the long-term equalization filter to the processed binaural audio signal.

8. The apparatus as claimed in claim 1, wherein the at least one memory and the computer program code are configured to, with the at least one processor, cause the apparatus to:
generate an estimate of at least a part of a covariance matrix for the at least one frequency band of the binaural audio signal;
generate an energy estimate for the at least one frequency band of the binaural audio signal;
generate at least a part of a target covariance matrix for the at least one frequency band of the binaural audio signal based on the at least one direction parameter for the at least one frequency band;
generate a mixing matrix for mixing the at least one frequency band of the binaural audio signal; and
generate a left channel audio signal and a right channel audio signal from a combination of channels of the at least one frequency band of the binaural audio signal based on the mixing matrix.

9. The apparatus as claimed in claim 8, wherein the at least two audio signals for loudspeaker reproduction comprise the left channel audio signal and the right channel audio signal.

10. The apparatus as claimed in claim 8, wherein the at least one memory and the computer program code are configured to, with the at least one processor, cause the apparatus to:
generate, for at least one frequency band, a decorrelated audio signal based on the binaural audio signal;
generate a further mixing matrix for the decorrelated audio signal;
generate a further left channel audio signal and a further right channel audio signal from a combination of channels of the at least one frequency band of the decorrelated audio signal based on the further mixing matrix;
combine the left channel audio signal and the further left channel audio signal to generate a combined left channel; and
combine the right channel audio signal and the further right channel audio signal to generate a combined right channel, and wherein the at least two audio signals for loudspeaker reproduction comprise the combined left channel audio signal and the combined right channel audio signal.

11. The apparatus as claimed in claim 1, wherein the at least one memory and the computer program code are configured to, with the at least one processor, cause the apparatus to analyse the at least one frequency band of the binaural audio signal to determine the at least one direction parameter for the at least one frequency band.

12. The apparatus as claimed in claim 11, wherein the at least one memory and the computer program code are configured to, with the at least one processor, cause the apparatus to:
estimate for the processed binaural audio signal a delay that maximizes a correlation between channels of the binaural audio signal; and
formulate a direction parameter based on the estimated delay.

13. The apparatus as claimed in claim 1, wherein the at least one memory and the computer program code are configured to, with the at least one processor, cause the apparatus to obtain for the at least one frequency band of the binaural audio signal a direct-to-total energy ratio value based on a measured normalized correlation between channels of the binaural audio signal.

14. The apparatus as claimed in claim 13, wherein the at least one memory and the computer program code are configured to, with the at least one processor, cause the apparatus to generate at least a part of a target covariance matrix for the at least one frequency band of the binaural audio signal based on the direct-to-total energy ratio value for the at least one frequency band.

15. The apparatus as claimed in claim 13, wherein the at least one memory and the computer program code are configured to, with the at least one processor, cause the apparatus to determine a binaural response and/or long-term response estimate based on the direct-to-total energy ratio value for the at least one frequency band.

16. The apparatus as claimed in claim 1, wherein the at least one memory and the computer program code are configured to, with the at least one processor, cause the apparatus to perform one of:
capture the binaural audio signal with a dummy head;
capture the binaural audio signal at an entrance of ear canals of a user;
render the binaural audio signals based on head-related transfer functions; or
render the binaural audio signals using binaural room impulse responses.

17. The apparatus as claimed in claim 1, wherein the at least one memory and the computer program code are configured to, with the at least one processor, cause the apparatus to output the at least two audio signals for loudspeaker reproduction to stereo loudspeakers.

18. A method comprising:
obtaining a binaural audio signal;
obtaining, based on analysis of at least one frequency band of the binaural audio signal, at least one direction parameter of the at least one frequency band of the binaural audio signal;
processing the binaural audio signal to generate at least two audio signals for loudspeaker reproduction with modifying an inter-channel difference of the at least one frequency band of the binaural audio signal based on the at least one direction parameter for the at least one frequency band; and
outputting the at least two audio signals for loudspeaker reproduction.

19. The method as claimed in claim 18, wherein the inter-channel difference comprises at least one of:
at least one energy/amplitude difference for channels of the binaural audio signal;
at least one phase difference for channels of the binaural audio signal; or
at least one time difference for channels of the binaural audio signal.

20. A non-transitory computer readable medium comprising program instructions for causing an apparatus to perform at least the following:
obtaining a binaural audio signal;
obtaining, based on analysis of at least one frequency band of the binaural audio signal, at least one direction parameter of the at least one frequency band of the binaural audio signal;
processing the binaural audio signal to generate at least two audio signals for loudspeaker reproduction with modifying an inter-channel difference of the at least one frequency band of the binaural audio signal based on the at least one direction parameter for the at least one frequency band; and outputting the at least two audio signals for loudspeaker reproduction.

\* \* \* \* \*